(12) United States Patent
Hsiao et al.

(10) Patent No.: US 9,346,316 B2
(45) Date of Patent: May 24, 2016

(54) NON-ROTATING WHEEL COVER FOR LARGE AUTOMOBILE

(75) Inventors: Leslie Hsiao, Orlando, FL (US);
Godfried C. M. de Jong, Wolfheze (NL)

(73) Assignee: Rigidisc Media, Inc., Orlando, FL (US)

( * ) Notice: Subject to any disclaimer, the term of this patent is extended or adjusted under 35 U.S.C. 154(b) by 0 days.

(21) Appl. No.: 11/799,845

(22) Filed: May 3, 2007

(65) Prior Publication Data

US 2008/0272642 A1    Nov. 6, 2008

(51) Int. Cl.
*B60B 7/04* (2006.01)
*B60B 7/20* (2006.01)

(52) U.S. Cl.
CPC .......................................... *B60B 7/20* (2013.01)

(58) Field of Classification Search
USPC ................ 301/37.101, 37.25, 37.102, 37.32, 301/337.33, 37.34, 37.109, 37.42, 37.35, 301/37.106, 37.28; 40/587; D12/204, 206, D12/209
See application file for complete search history.

(56) References Cited

U.S. PATENT DOCUMENTS

| | | | | |
|---|---|---|---|---|
| 4,593,953 A * | 6/1986 | Baba et al. | ...................... | 301/6.3 |
| D343,606 S * | 1/1994 | Chung-Li | ...................... | D12/209 |
| 5,659,989 A * | 8/1997 | Hsiao et al. | ...................... | 40/587 |
| 6,517,168 B1 * | 2/2003 | Van Houten | ............... | 301/37.42 |
| 6,702,396 B1 * | 3/2004 | Wang | .......................... | 301/37.25 |
| 6,799,810 B1 * | 10/2004 | Wang | .......................... | 301/37.25 |
| D501,438 S * | 2/2005 | Chiu | ............................ | D12/209 |
| 7,014,273 B1 * | 3/2006 | Yang et al. | ................. | 301/37.25 |
| 7,121,631 B2 * | 10/2006 | Strzelczyk | ................. | 301/37.25 |
| 7,303,240 B2 * | 12/2007 | Lin | .............................. | 301/37.32 |
| 7,396,087 B1 * | 7/2008 | Baker | ........................ | 301/37.25 |
| 2005/0206218 A1 * | 9/2005 | Clifford et al. | ............ | 301/37.25 |

\* cited by examiner

*Primary Examiner* — S. Joseph Morano
*Assistant Examiner* — Kip T Kotter
(74) *Attorney, Agent, or Firm* — Wang Law Firm, Inc.; Li K. Wang

(57) ABSTRACT

An positionally stable wheel cover for displaying a design while a wheel is rotating. The wheel cover is mounted on the rim of a wheel through a mounting wire and a support bracket is mounted on the mounting wire. The support bracket is equipped with an internal base with a hollow hub into which another hub of an external base with a bearing mounted is inserted. The external base is able to rotating independently from the internal base and from the support bracket. A display cover is mounted on the external base and a design can then be placed on the display cover.

11 Claims, 13 Drawing Sheets

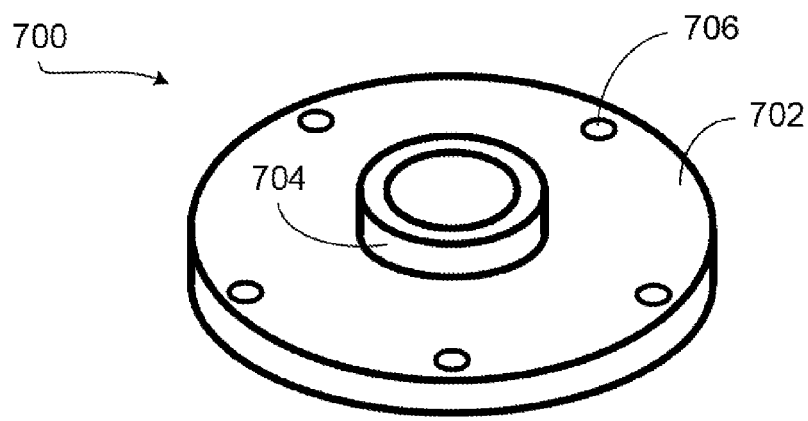
FIG. 7
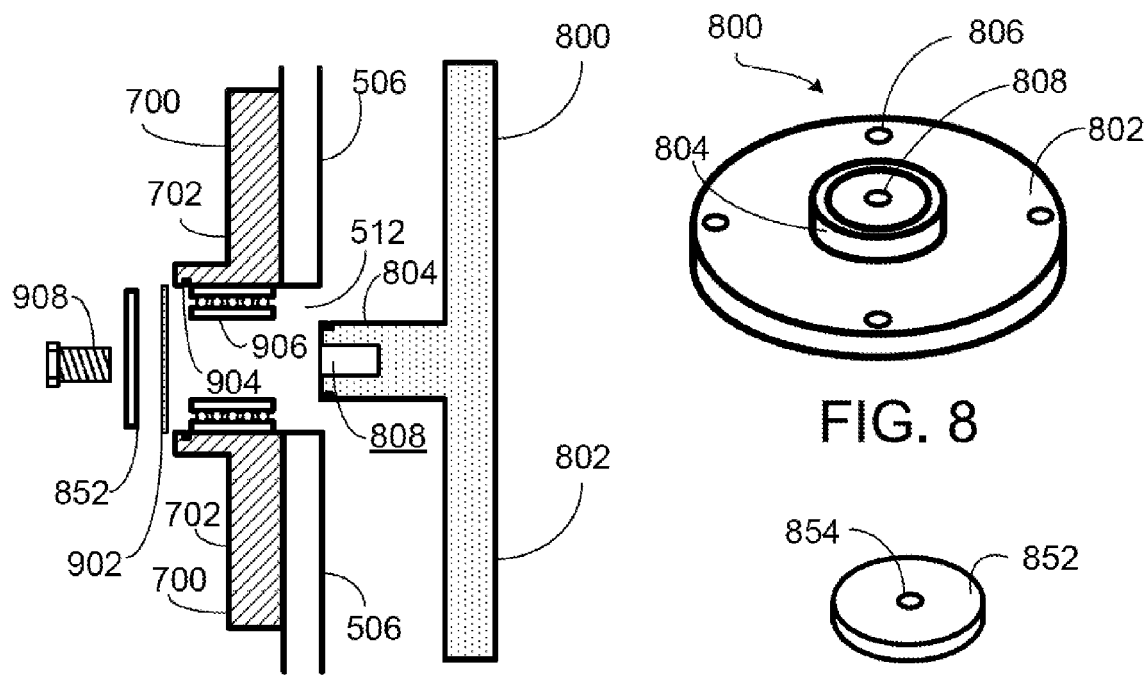
FIG. 8
FIG. 9
FIG. 8A

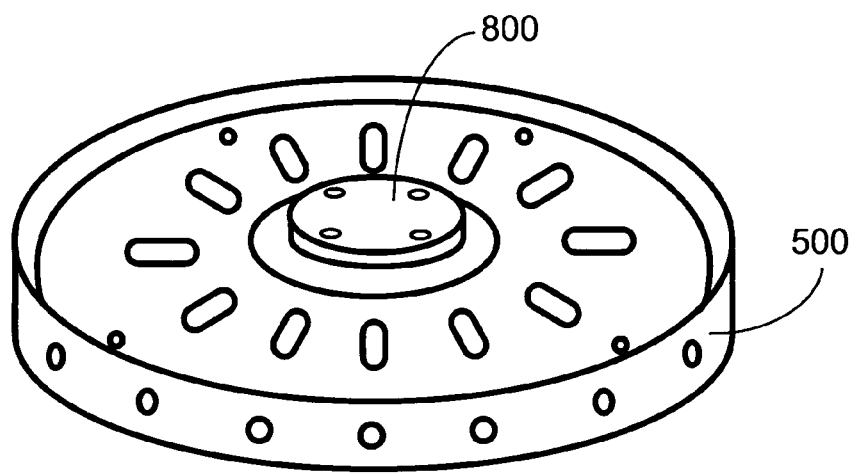
FIG. 10
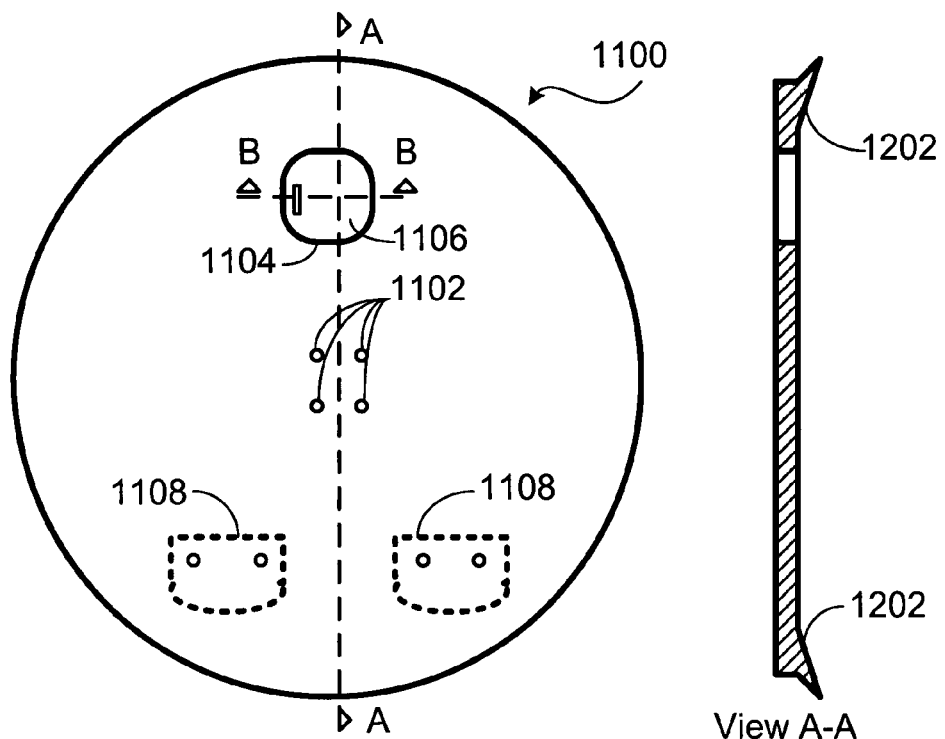
FIG. 11
FIG. 12

View B-B

NON-ROTATING WHEEL COVER FOR LARGE AUTOMOBILE

FIELD OF THE INVENTION

The present invention relates to automobile and more specifically to wheel cover.

BACKGROUND OF THE INVENTION

Automobile is an important part of the modern society and it not only serves as transportation means but also as communication means. Some people paint their cars with designs that express their individuality or advertise their business, while others add extra features to their vehicles to distinguish their vehicles from others. There are wheel covers that rotate even when a car is in a stationary position and that rotating movement catches attention of others, thus distinguishing the car from other cars.

Besides pure decorative purposes, some people have used their automobiles for advertising purposes and decorative wheel covers have been designed for this purpose. These decorative wheel covers generally do not rotate with the wheel, thus allowing others to see the designs fixed on these wheel covers. However, the decorative wheel covers are generally designed for small vehicles in which the wheels having generally the same shape. These covers cannot be used for larger automobiles, such as buses or trucks, where the wheels are usually mounted on a protruding or a receding wheel shaft.

Besides the physical difference between the wheel shaft of a passenger car and the wheel shaft of a bus, there is also a different safety requirement for the wheel covers. It is a common requirement for a bus and/or truck driver to visually inspect the tightness of mounting nuts that secure the wheel to the wheel shaft. The wheel cover for the bus should not be an obstacle to the visual inspection.

Therefore, it is desirable to have a positionally stable wheel cover that can be mounted on large trucks or buses and such wheel cover allowing easy visual access to the mounting nuts, and to such wheel cover the present invention is primarily directed.

SUMMARY OF THE INVENTION

Briefly described, a positionally stable wheel cover mounted on a rim of a wheel is disclosed in the present application. The positionally stable wheel cover has a mounting ring mounted on the rim of the wheel, a support bracket mounted on the mounting ring, an external base with a substantially circular hub and a bearing mounted on the substantially circular hub, and a substantially circular display cover removably mounted on the external base. The support bracket has a substantially circular skirt with an outer edge and a face plate with a plurality of check holes mounted inside the substantially circular skirt, and the face plate has a center opening. The bearing of the external base is inserted into the center opening such that the external base being capable of rotating independently from the support bracket. The substantially circular display cover has a substantially circular edge bent away from the external base, and the substantially circular edge is located inside the support bracket and adjacent to the outer edge of the substantially circular skirt. The substantially circular display cover has a top portion and a bottom portion, and the bottom portion has more weight than the top portion. The substantially circular display cover has a check window. When the wheel is rotating, the substantially circular display cover does not rotate with the wheel.

In another embodiment, there is provided a positionally stable wheel cover mounted on a rim of a wheel is disclosed in the present application. The positionally stable wheel cover has a mounting ring removably mounted on the rim of the wheel, a support bracket mounted on the mounting ring, an external base with a flange, a hub and a bearing mounted on the hub, a display cover removably mounted on the external base. A design plate can be mounted on the display cover. The support bracket has a substantially circular skirt with an outer edge and a face plate with a plurality of check holes mounted inside the substantially circular skirt, and the face plate has a center opening. The bearing of the external base is inserted into the center opening such that the external base being capable of rotating independently from the support bracket. When the wheel is rotating, the design plate does not rotate with the wheel.

In yet another embodiment, a positionally stable wheel assembly mounted on a shaft of a wheel through a plurality of lug nuts is disclosed. The positionally stable wheel cover includes a support bracket and an external base. The support bracket has a plurality of lug nut openings, an outer edge and a face plate with a plurality of check holes. The face plate has a center opening and the support bracket is mounted onto the shaft with the lug nuts inserted through the lug nut openings. The external base has a hub and a bearing mounted on the hub. The external base has a top portion and a bottom portion and the bottom portion has more weight than the top portion. The bearing of the external base is inserted into the center opening such that the external base is capable of rotating independently from the support bracket, such that when the wheel is rotating, the external base does not rotate with the wheel.

Additional features and advantages of the invention will be readily apparent from the following detailed description and appended claims when taken in conjunction with the accompanying drawings.

BRIEF DESCRIPTION OF THE DRAWING

For a fuller understanding of the nature of the invention, reference should be made to the following detailed description taken in connection with the accompanying drawings, in which similar references numbers refer to similar parts throughout the several views of the drawings and that drawings are not drawn to scale unless otherwise stated.

FIG. 7 is a perspective view of an internal base.

FIG. 8 is a perspective view of an external base.

FIG. 8A is a perspective view of a locking disk.

FIG. 9 illustrates a coupling scheme between an external base, an internal base, and a face plate.

FIG. 10 illustrates an assembly of a support bracket with an external base and an internal base.

FIG. 11 illustrates a circular display cover.

FIG. 12 illustrates a cross section view of a circular display cover.

DETAIL DESCRIPTION OF THE INVENTION

Figure 1:
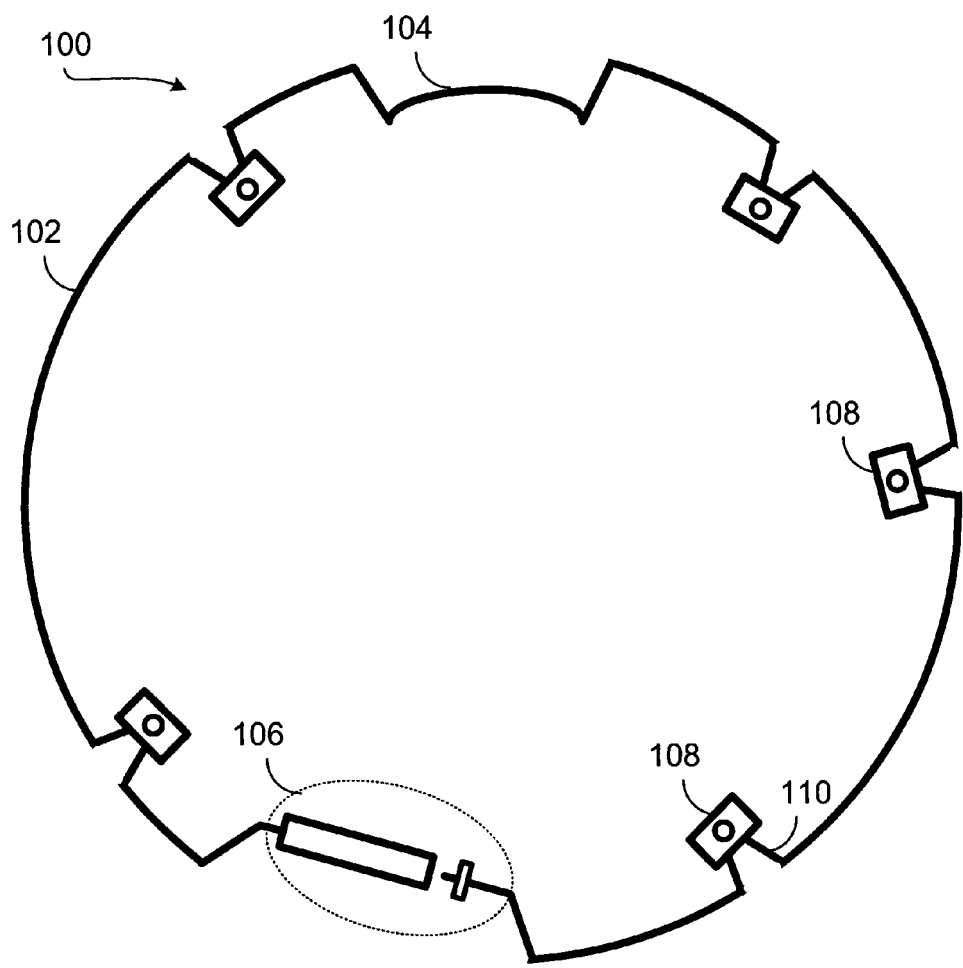
FIG. 1 illustrates a mounting ring.

Briefly described, the wheel cover according to one embodiment of the invention enables a display cover with decorative design to be mounted on a wheel, such that when the wheel is rotating, the display cover remains positionally stable, thus allowing the decorative design is visible by others. FIG. 1 illustrates a mounting ring 100. The mounting ring 100 is generally made from a metallic wire 102 with a generally circular shape and mounted on the rim of a wheel. The mounting ring 100 includes a spring recess 104, a locking connector 106, and a plurality of holders 108. The spring recess 104 is generally mounted on the part of the rim where a wheel balancing weight for balancing purpose is located. The spring recess 104 also enables the mounting ring 100 to be tightly mounted on the rim by providing some tension to the mounting ring 100. The plurality of holders 108 are used for mounting a support bracket. Each of the holders 108 is mounted on the metallic wire 102 and equipped with a hole in which a screw can be inserted. Alternatively, the metallic wire 102 may have a plurality of mini-recesses 110 and each holder 108 can be mounted in each mini recess 110. The mounting ring 100 can be tightly mounted on the rim by tightening the locking connector 106.

Figure 2:
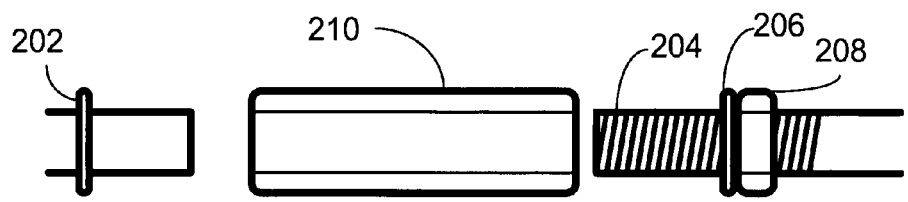
FIG. 2 illustrates a locking connector used in a mounting ring according to one embodiment of the invention.

FIG. 2 illustrates a locking connector 106 according to one embodiment of the invention. One end of the metallic wire 102 may be equipped with a stopper ring 202 and another end of the metallic wire 102 may be equipped with an external thread 204, another stopper ring 206, and a nut 208. The locking connector 106 also includes a hollow coupler 210 with internal threads. The end with the stopper ring 202 is inserted into one end the hollow coupler 210 and the threaded end of the metallic wire 102 is inserted into the other end of the hollow coupler 210. The mounting ring 100 can then be snuggly fit in the rim by first tightening the hollow coupler 210, and then tightening the nut 208 that pushes the stopper ring 206 against the hollow coupler 210. Alternatively, the mounting ring 100 may be single ring soldered onto the rim without use of a locking connector.

Figure 3:
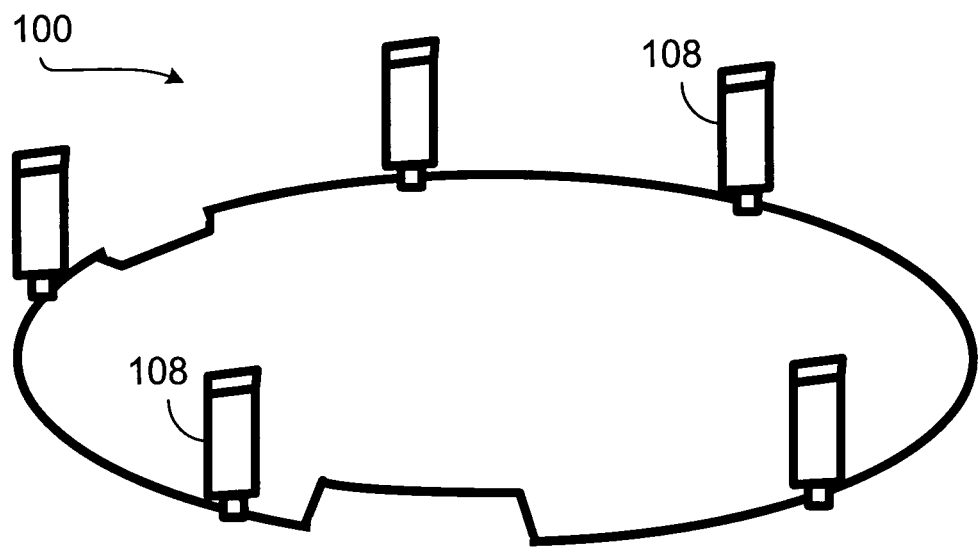
FIG. 3 is a perspective illustration of a mounting ring with holders.
Figure 4:
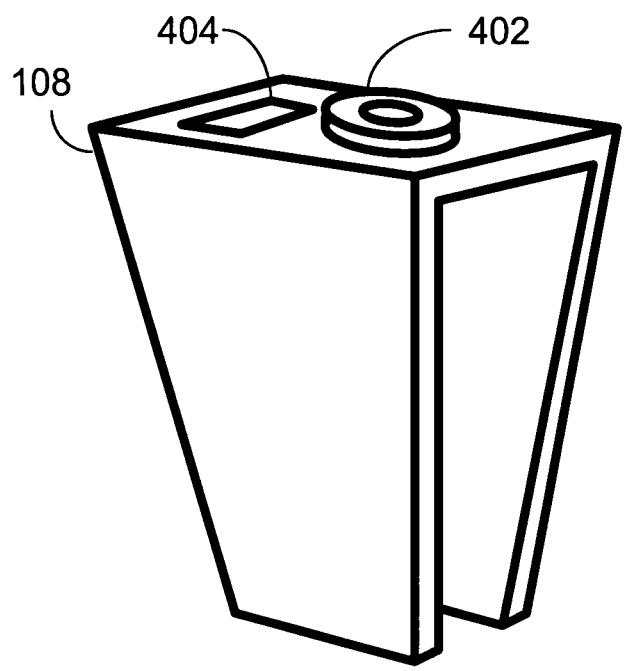
FIG. 4 is an illustration of a holder.

FIG. 3 is a perspective illustration of a mounting ring 100 with a plurality of holders 108. FIG. 4 illustrates a holder 108. The holder 108 may be made from metallic, plastic material, or rubber. The holder 108 can be permanently soldered to the metallic wire 102 or alternatively be attached through well-known attaching mechanisms (not shown) to the metallic wire 102. The holder 108 is provided with a screw hole 402 and/or a clip slot 404. The holder 108 has a height that may vary. For a truck or bus that has a significant protruding wheel shaft, a holder 108 with greater height may be used; for a truck with a shorter protruding wheel shaft, a holder 108 with shorter height may be used.

Figure 5:
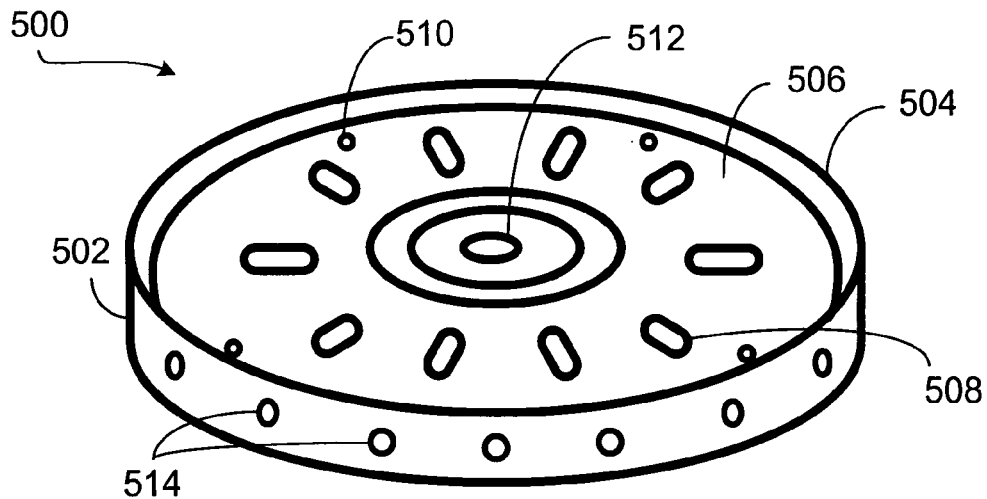
FIG. 5 is a perspective view of a support bracket.

FIG. 5 is a perspective view of a support bracket 500. The support bracket 500 is attached to the mounting ring 100 through the plurality of holders 108. The support bracket 500 has a circular skirt 502 with an external edge 504 and a face plate 506. The face plate 506 is slightly recessed from the external edge 504 such that a display cover can be placed adjacent to the face plate 506 without extending beyond the external edge 504. The recess of the face plate 506 from the external edge 504 may vary depending on assembly of the wheels on the wheel shaft. For example, the recess may be 3.75" for a support bracket for a front wheel and 0.75" for a support bracket for a rear wheel. The face plate 506 has a plurality of check holes 508, a plurality of screw holes 510, and a center opening 512. The check holes are designed to align with mounting nuts (lug nuts) of each wheel. The placement and number of check holes may depend on the type of wheel on which the support bracket is mounted. The screw holes 510 are generally aligned with the holders 108 and screws (not shown) attach the support bracket 500 to the holders 108 through the screw holes 510. The circular skirt 502 may also include a plurality of vent openings 514. The vent openings 514 allow airflow to and from the wheel shaft (not shown) and also reduces the weight of the support bracket 500.

Figure 19:
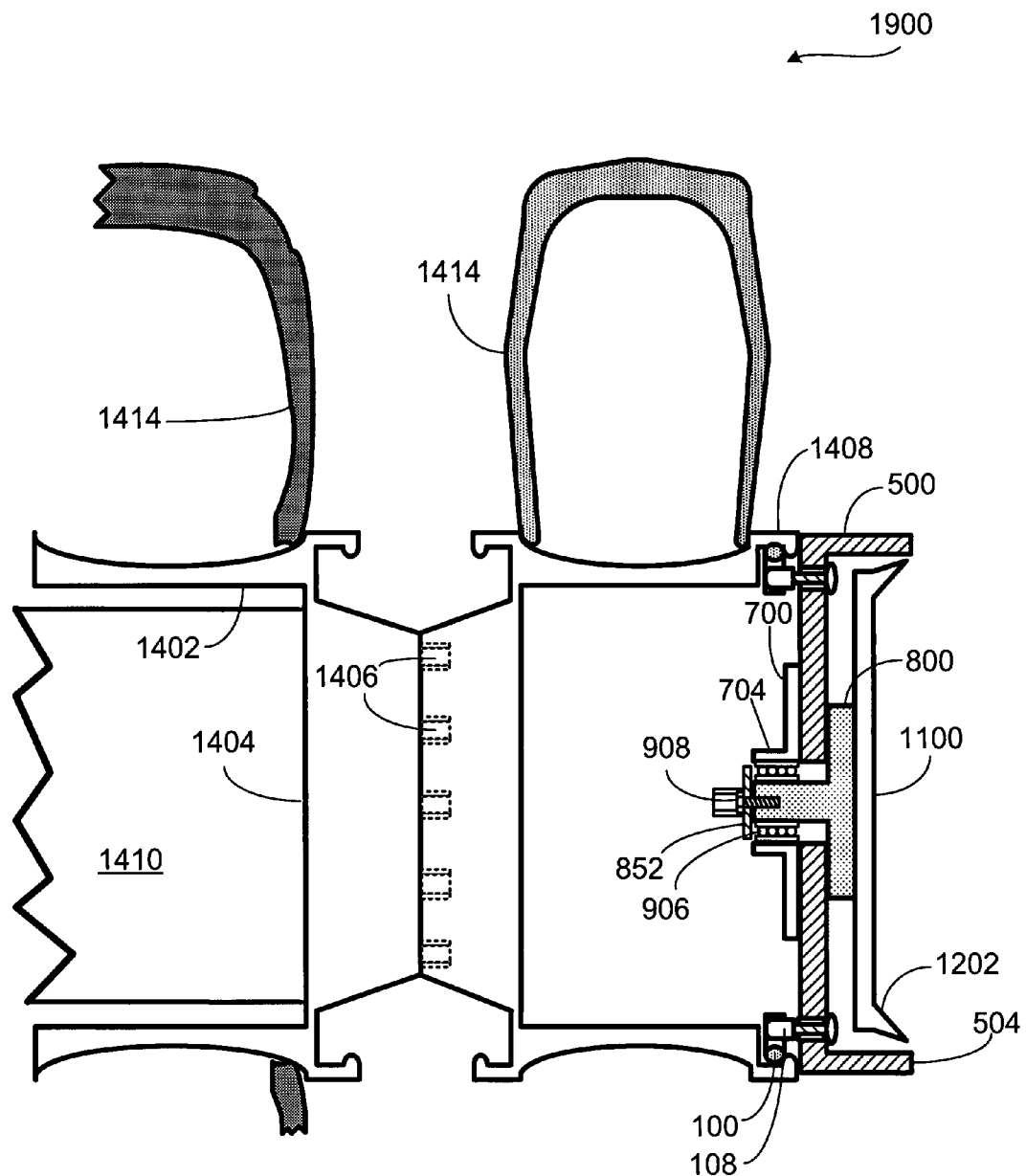
FIG. 19 is a cross section view of a positionally stable wheel cover assembled onto a rear wheel.

Alternatively, for a support bracket 500 fitted for rear wheels of a truck or bus, where two wheels are placed side by side on each side of the truck or bus and the wheel shaft is receded from a plan defined by the outer edge of the outer wheel, the support bracket 500 can be without a circular skirt 502 and the holder 108 can have a reduced height. The support bracket 500 without the circular skirt 502 and with the holders 108 of reduced height allows the entire assembly of the positionally stable wheel cover be less protruding from the wheels. The assembly of a positionally stable wheel cover onto a rear wheels of a truck or bus, where two tires 1414 are mounted side by side, employing a support bracket 500 without a circular skirt 502 is shown in FIG. 19 (not drawn to scale).

Figure 6:
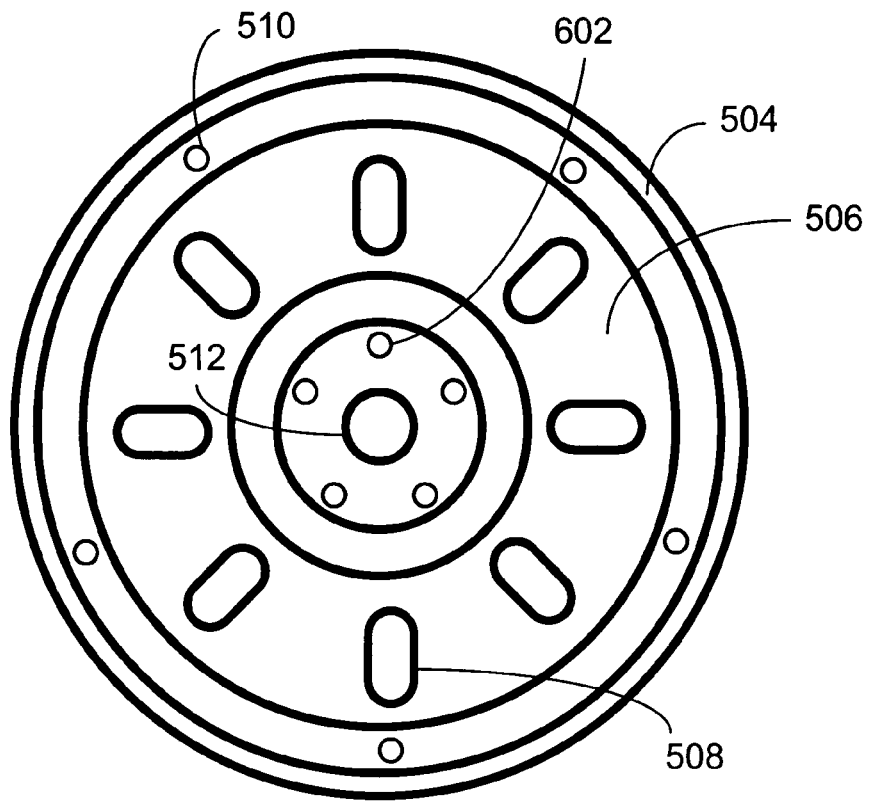
FIG. 6 is a top view of the support bracket.

FIG. 6 is a top view of the support bracket 500. The support bracket 500 may include a plurality of base mounting holes 602. An internal base with a hollow circular hub (not shown) may be attached to the face plate 506 with screws through the base mounting holes 602. The hollow circular hub can be inserted in the center opening 512.

FIG. 7 is an illustration of an internal base 700. The internal base 700 has a flange 702 and a protruding concentric circular hollow hub 704. There is a plurality of openings 706 on the flange 702. The internal base 700 can be attached to the face plate 506 by inserting screws through the screw holes 510 and into the openings 706. FIG. 8 illustrates an external base 800 with a flange 802, a protruding concentric circular hub 804, a plurality of openings 806, and a center hole 808. The protruding circular hub 804 can be fitted inside the circular hollow hub 704 of the internal base 700. To ensure an independent rotation between the external base 800 and the internal base 700, a bearing 906 (shown in FIG. 9) is generally fitted inside the protruding circular hollow hub 704. Alternatively, the bearing 906 maybe fitted on the protruding circular hub 804.

FIG. 8A illustrates a circular locking disk 852 with a center hole 854. The circular locking disk 852 is attached to the protruding circular hub 804 through a mounting screw 908 (shown in FIG. 9). The circular locking disk 852 has a diameter that can be fitted inside the protruding circular hollow hub 704. The circular locking disk 852, once mounted on the protruding circular hub 804, prevents the protruding circular hub 804 from falling out from the protruding circular hollow hub 704.

FIG. 9 illustrates a coupling scheme between the external base 800, the internal base 700, and the face plate 506. The bearing 906 is fitted inside the internal base 700, which is mounted into the center opening 512 on the face plate 506, and the external base 800 is then inserted into the protruding circular hollow hub 704. The bearing 906 is secured inside the protruding circular hollow hub 704 with a locking ring 902 placed in a groove 904. The protruding circular hub 804 is prevented from slipping out of the protruding circular hollow hub 704 by the mounting screw 908 inserted through the center hole 854 of the locking disk 852 and into the center hole 808 of the external base 800. A spring ring (not shown) may be used to provide tension to the mounting screw 908, thus securely fastening the locking disk 852. Alternatively, other mechanisms for securing the protruding circular hub 804 may also be used. Because of the bearing 906, the internal base 700 can rotate independently from the external base 800 and the face plate 506. FIG. 10 illustrates an assembly of a support bracket 500 with an internal base (not visible) and an external base 800.

Figure 17:
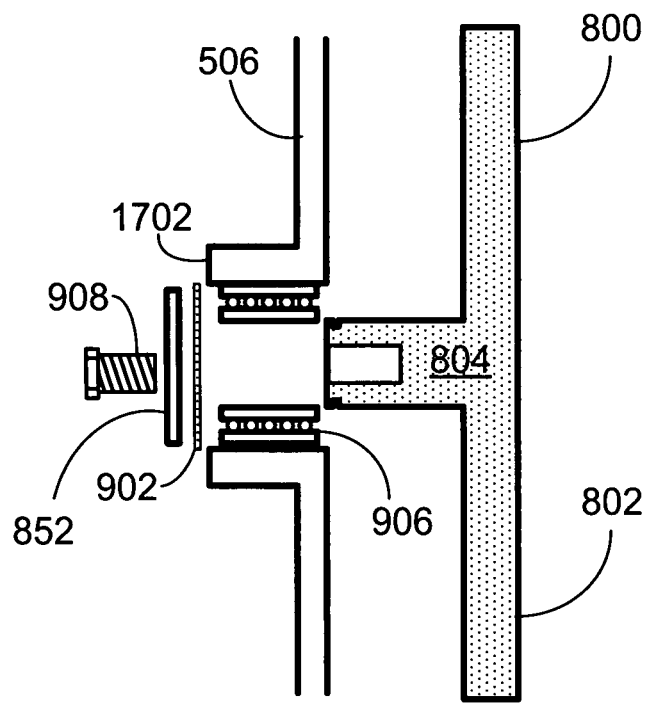
FIG. 17 illustrates an alternative embodiment for attachment of an external base to a face plate.

In an alternative embodiment as shown in FIG. 17, the external base 800 maybe attached to the face plate 506 without an internal base 700. The protruding circular hub 804 can be inserted into a modified center opening of the face plate 506 where the bearing 906 is placed. The modified center opening includes a small circular flange 1702 into which the bearing 906 is snuggly placed and secured through the locking ring 902. The protruding circular hub 804 can then be secured through a mounting screw 908 and a locking disk 852.

FIG. 11 illustrates a circular display cover 1100. The circular display cover includes a set of screw holes 1102 and a checking window 1104 with a removable door 1106. The circular display cover 1100 can be fixed to the external base 800 by inserting screws through the screw holes 1102 into the openings 806. The circular display cover 1100 also may include one or more weight elements 1108 that provide positional stability to the circular display cover 1100. The weight elements 1108 are preferably mounted on the back side (toward the wheel shaft) of the circular display cover 1100, such that the front side (away from the wheel shaft) will be substantially flat for placement of a design. The design can be painted on or glued to the circular display cover 1100. The checking window 1104 is preferably located at a position such that when the removable door 1106 is removed, by rotating the circular display cover 1100, a bus driver may be able to see all the lug nuts securing the wheel to the wheel shaft. The circular display cover 1100 preferably has its edge 1202 bent upward (away from the wheel shaft) as shown in FIG. 12. By having the edge bent upwardly, when the circular display cover 1100 is removed from the external base 800 and laid on the ground, the design that is placed on the front side will not touch the ground and thus not be scratched. Alternatively, the design can be placed on a separate circular plate and attached to the circular display cover 1100.

Figure 18:
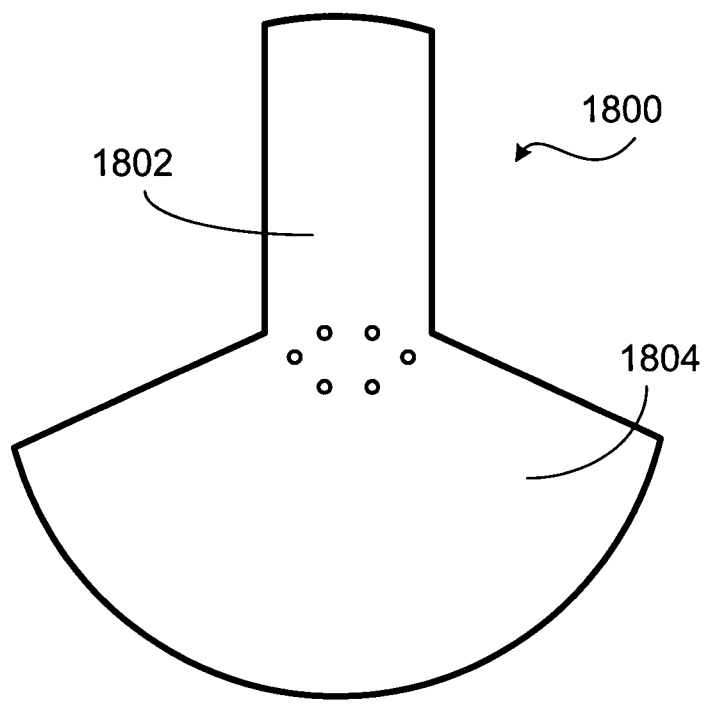
FIG. 18 illustrates an alternative embodiment for a display cover.

In an alternative embodiment shown in FIG. 18, the display cover 1800 does not have full circular shape. The display cover 1800 shown in FIG. 18 has an elongated upper portion 1802 and a pie shaped lower portion 1804. Because of asymmetry between the upper portion 1802 and the lower portion 1804, the use of weight elements 1108 can be eliminated. A design placed on a separate circular design plate (not shown) may then be attached to the display cover 1800 through conventional means. Alternatively, a designed artwork on a "peel and stick" vinyl paper can be placed directly on the display cover 1800. Preferably the display cover 1800 has a checking window with a door that allows checking the wheel nuts.

Figure 13:
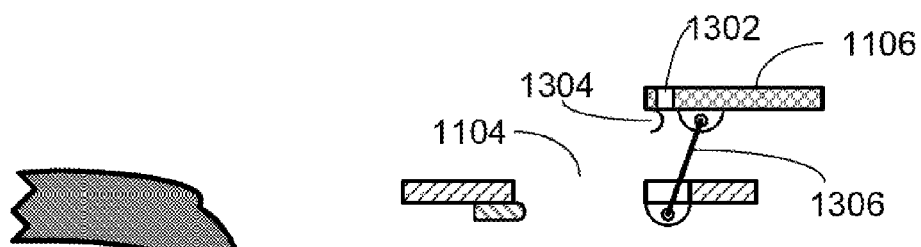
FIG. 13 is cross section view of a checking window.
Figure 22:
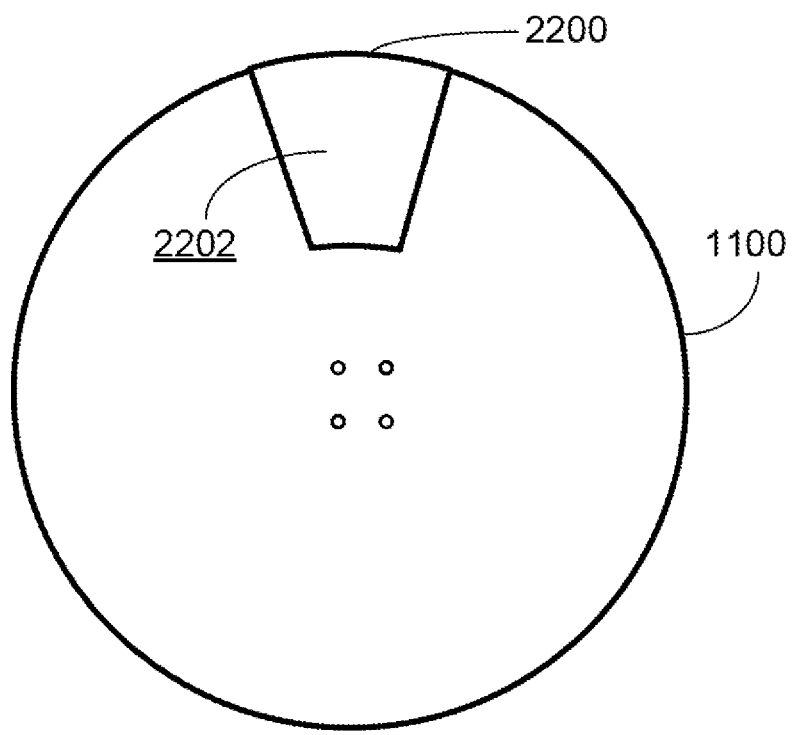
FIG. 22 illustrates an alternative embodiment of a checking window.
Figure 23:
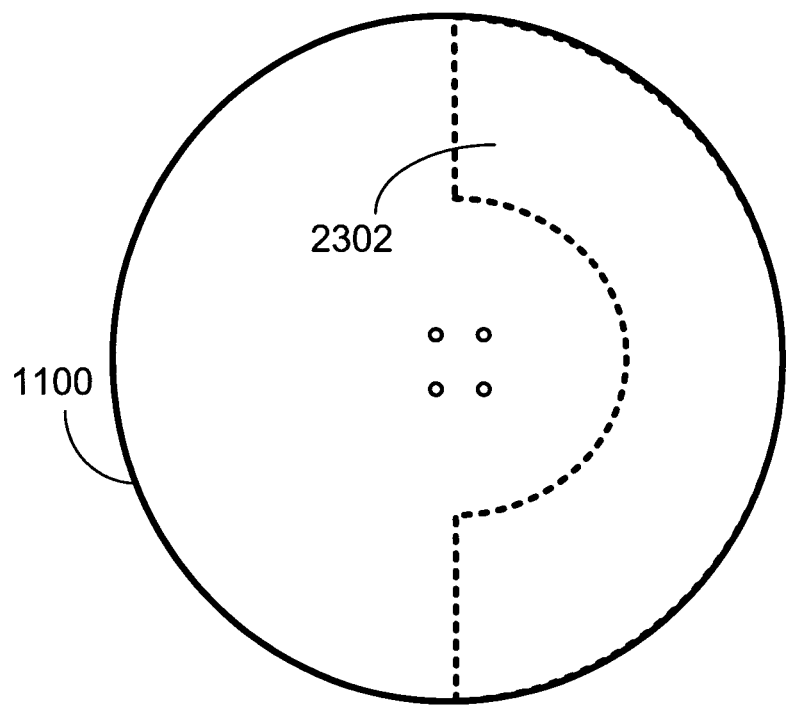
FIG. 23 illustrates yet another alternative embodiment of a checking window.

FIG. 13 is an illustration of cross section of a checking window 1104 with the removable door 1106 according to one embodiment of the invention. The removable door 1106, when in an open position, is attached through a support hinge 1306 to display cover 1100 and includes a slot 1302 for inserting a tool or a slot screwdriver to open the removable door 1106. The removable door 1106 also includes a latch 1304 for latching the removable door 1106 in the close position. Alternatively, the removable door 1106 can be totally detached from the circular display cover 1100 when it is opened. Those skilled in the art will appreciate that the checking window 1104 may have different shapes and different activation mechanisms. For example, the checking window 2200 may have a pie shaped door 2202 as shown in FIG. 22 with a hinge (not shown) on one of its sides securing the pie shaped door 2202. Optionally, the pie shaped door 2202 can be detached completely from the display cover 1100. In another alternative embodiment, the checking window 1104 may be equipped with a transparent cover that allows a visual inspection of the log nuts without removing any element. In yet another alternative embodiment shown in FIG. 23, the display cover 1100 has a special checking window with a "C" shaped door 2302. The "C" shaped door 2302 can be hinged on the display cover 1100 and allows easy inspection of lug nuts with a simple flip of the "C" shaped door 2302.

Figure 14:
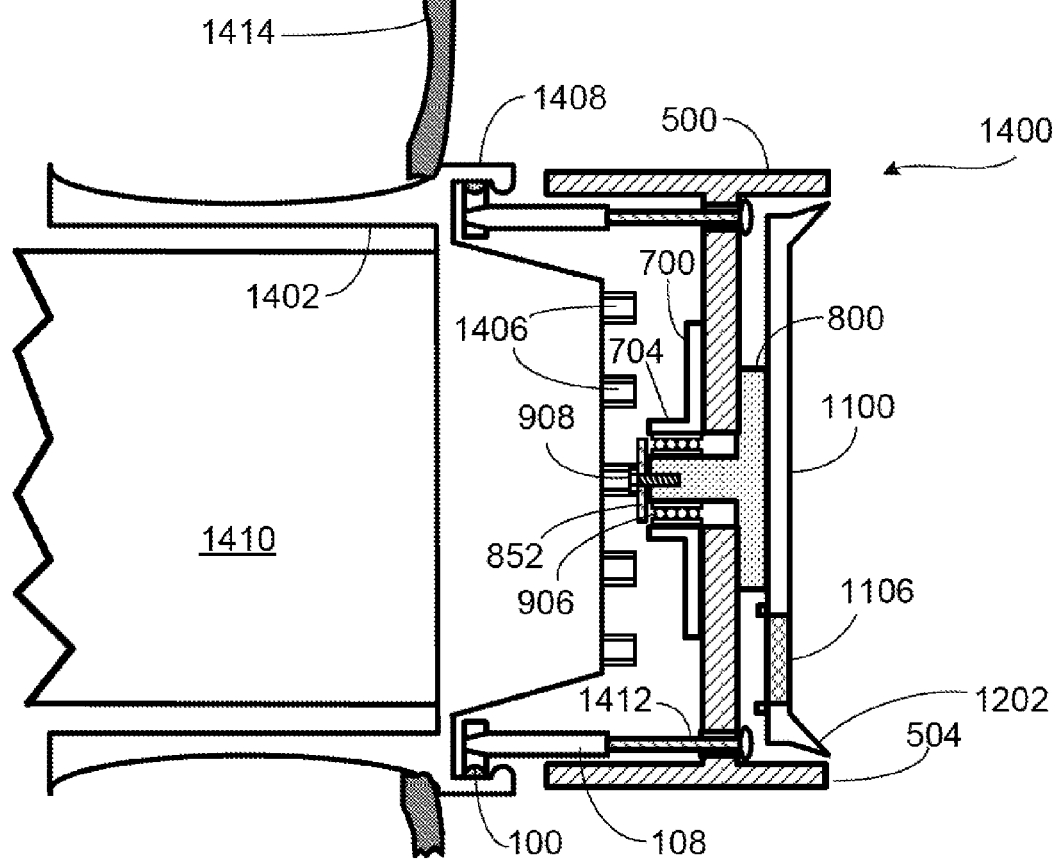
FIG. 14 is a cross section view of a positionally stable wheel cover assembled onto a front wheel.

FIG. 14 is a cross section view 1400 (not to the scale) of a positionally stable wheel cover assembled onto a front wheel 1402. The mounting ring 100 is mounted adjacent to the rim 1408 of the wheel 1402 and the wheel 1402 is mounted to the wheel shaft 1410 through lug nuts 1406 and a tire 1414 is mounted on the wheel 1402. The support bracket 500 is mounted on the mounting ring 100 through screws 1412 inserted on the holders 108. The internal base 700 is attached to the support bracket 500 and a bearing 906 is placed inside the protruding circular hollow hub 704. The protruding circular hub 804 of the external base 800 is placed inside the bearing 906 and the protruding circular hub 804 is secured in its position with a locking disk 852 secured through a mounting screw 908. The circular display cover 1100 is attached to the external base 800 and the edge 1202 of the circular display cover 1100 is adjacent, but within a plan defined by the external edge 504 of the support bracket 500. For aerodynamic purpose, the surface of the circular display cover 1100 ideally should be as close to the plane defined by the external edge 504 as possible, such that the air disturbance is minimized.

Figure 21:
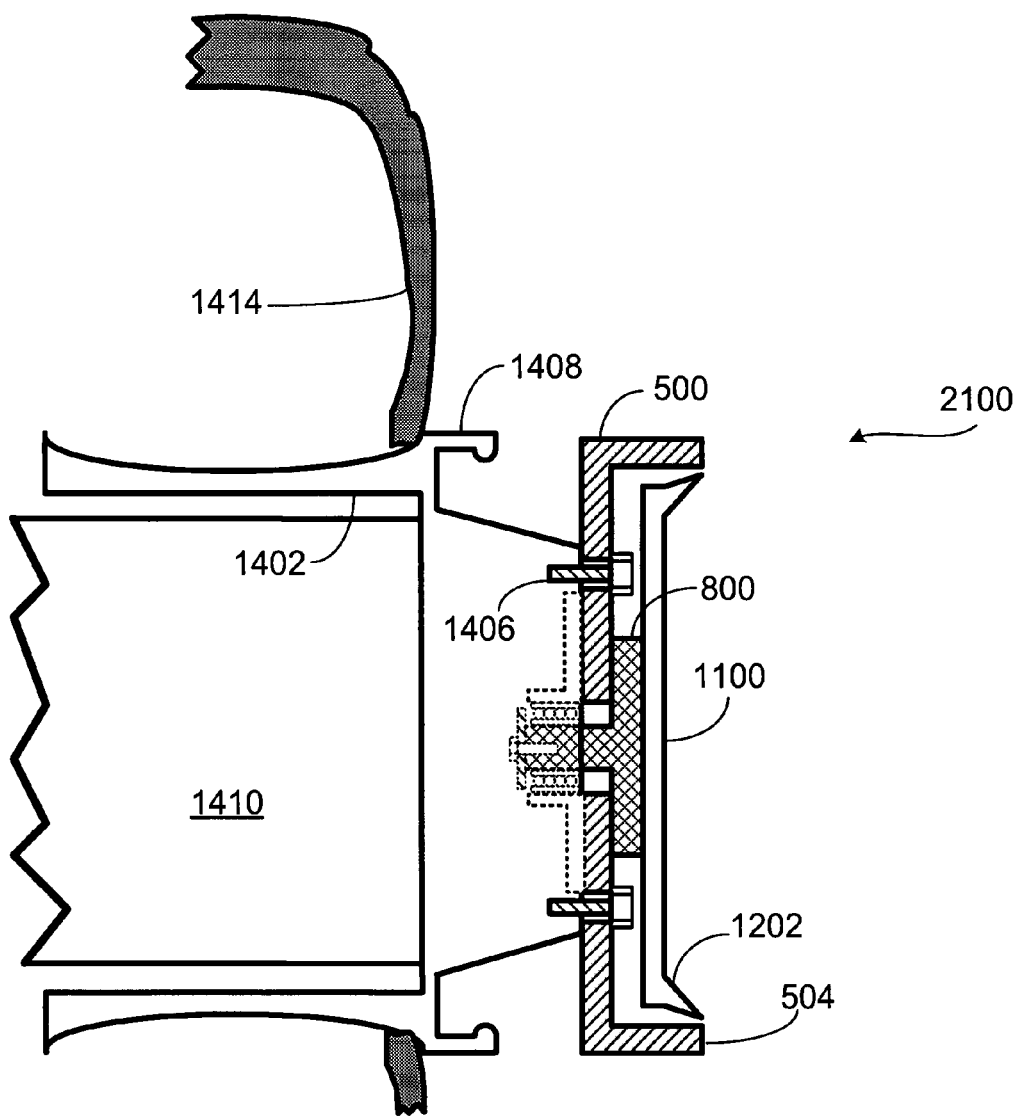
FIG. 21 is a cross section view of a positionally stable wheel cover with the support bracket assembled onto the wheel shaft through the lug nuts.

In an alternative embodiment 2100 shown in FIG. 21, the positionally stable wheel cover can be directly mounted on a wheel shaft 1410 without a mounting ring 100. The support bracket 500 will be equipped with additional openings through which lug nuts 1406 can be inserted and secured onto the wheel shaft 1410.

Figure 15:
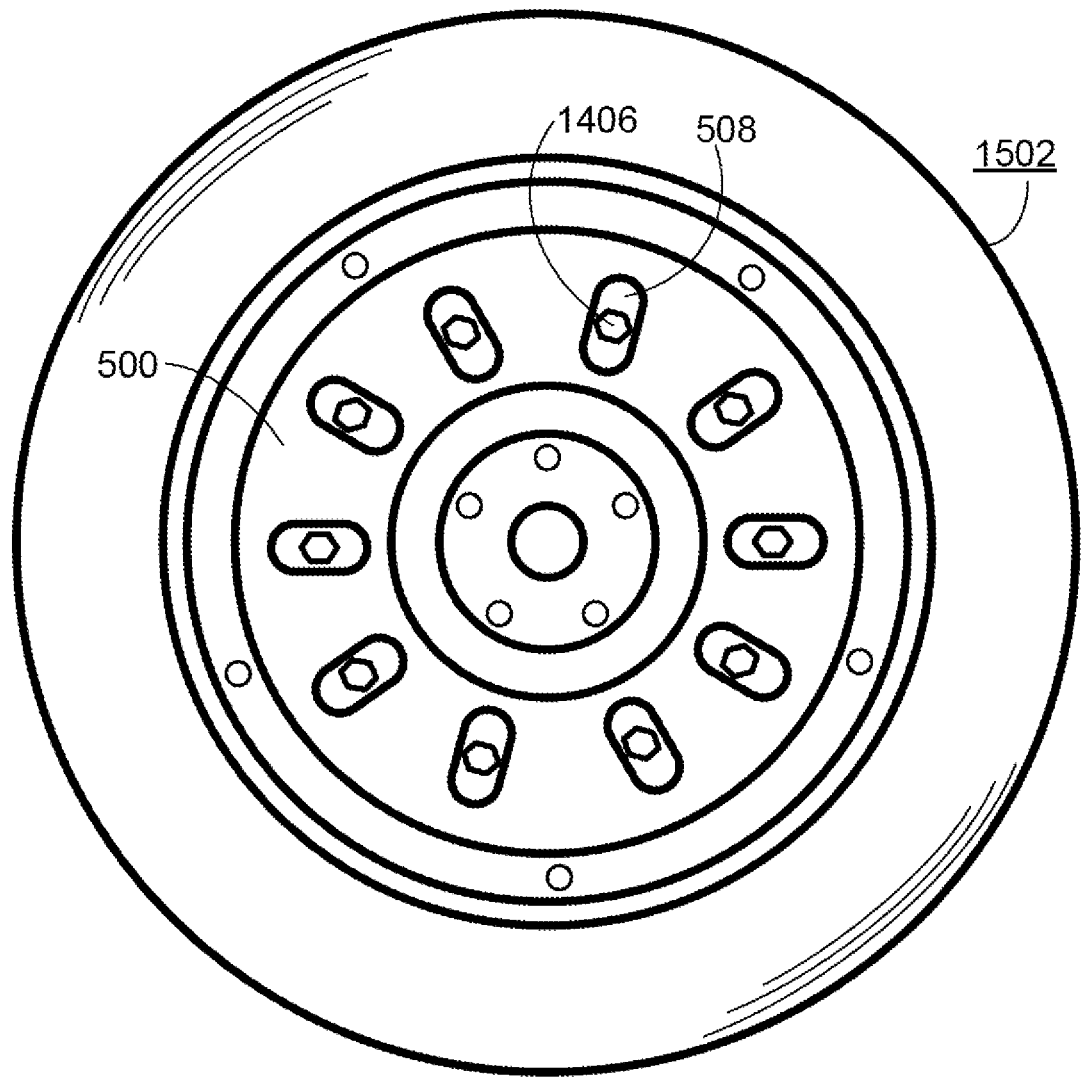
FIG. 15 is an illustration of a support bracket 500 mounted on a wheel.
Figure 16:
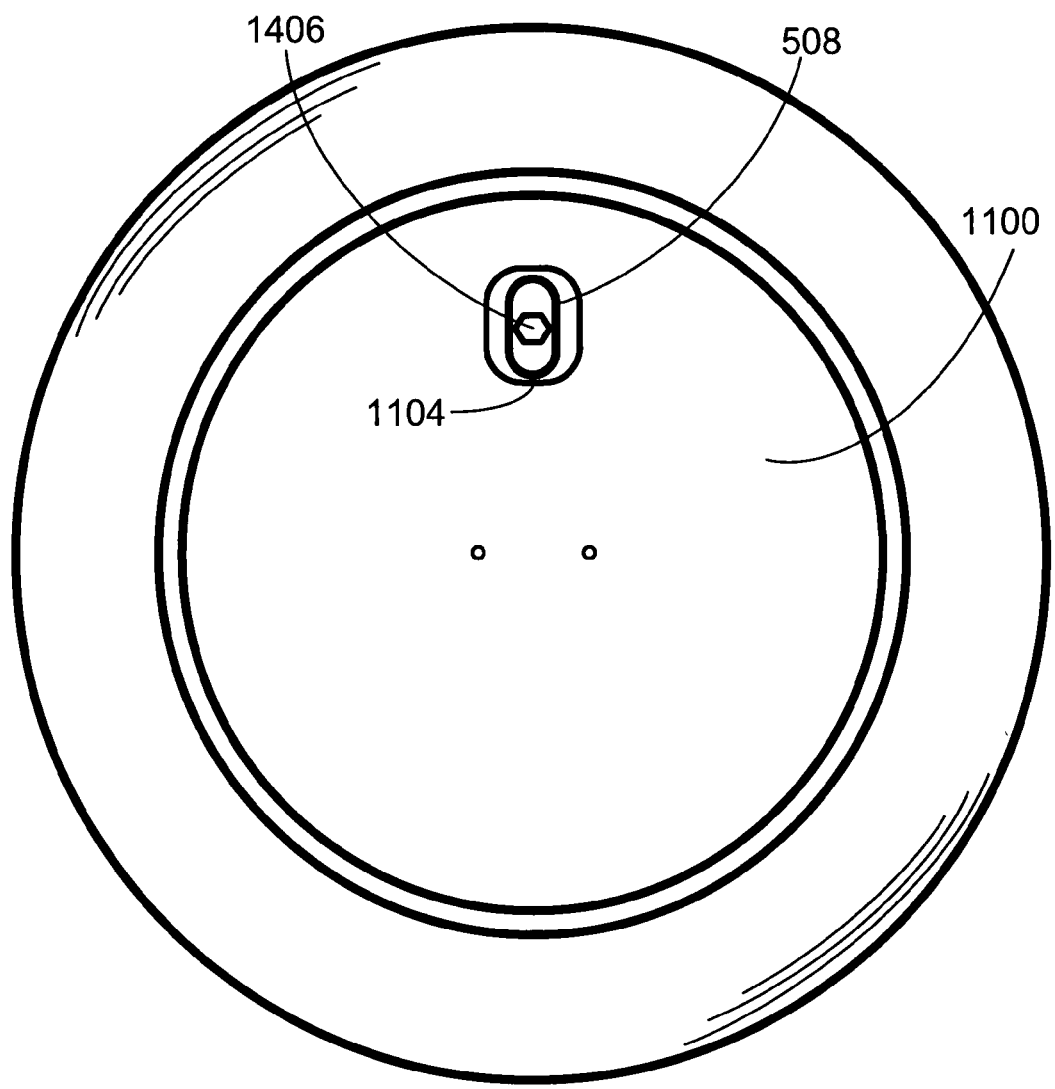
FIG. 16 illustrates a support bracket with a circular display cover mounted and the removable door removed.

FIG. 15 is an illustration of a support bracket 500 mounted on a wheel 1402. The lug nuts 1406 can be seen through the check holes 508. The number of check holes 508 on the face plate 506 of a support bracket 500 may vary pending on the number of lug nuts 1406 used to secure the wheel 1402 to the wheel shaft 1410 onto which a tire 1502 is mounted. In an alternative embodiment, each check hole 508 may be wider and overlap more than one single lug nut 1406, thus the number of check holes 508 may be reduced. FIG. 16 illustrates the support bracket 500 with a circular display cover 1100 mounted and the removable door 1106 removed. After the removable door 1106 is removed, the lug nut 1406 can be visible through the checking window 1104 and check hole 508.

Figure 20:
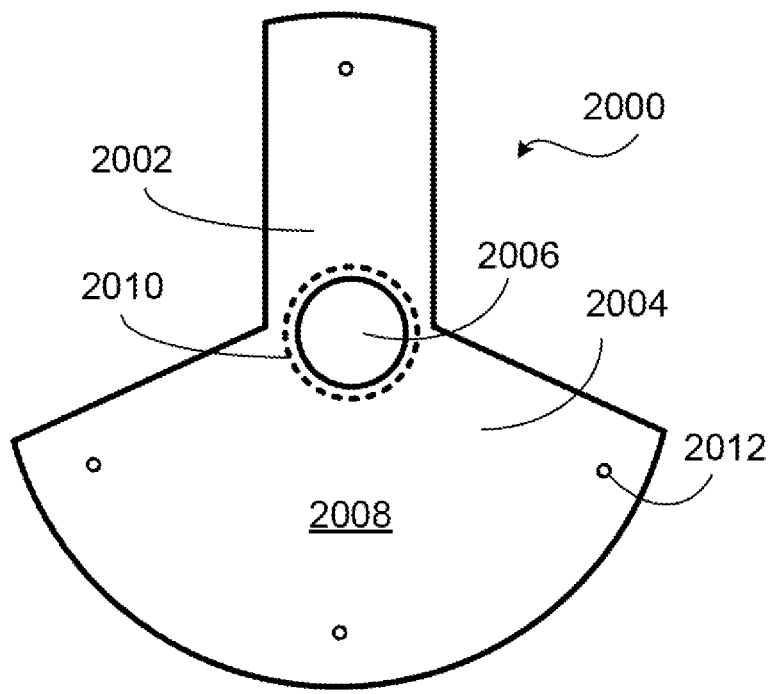
FIG. 20 illustrates an alternative embodiment for an external base.

In an alternative embodiment illustrated in FIG. 20, the external base 2000 may have an asymmetrically shaped flange 2008. The flange 2008 has a smaller upper portion 2002, a larger lower portion 2004, and a center opening 2006. The center opening 2006 is in the center of a protruding concentric circular hub 2010 (shown in dash lines). The flange 2008 further includes several openings 2012. The display cover 1100 can be mounted on the external base 2000 through a plurality of screws inserted in the openings 2012. Because of the asymmetrical shaped flange 2008, the display cover 1100 will be positionally stable without employing a counterweight.

It will be understood that each of the elements described above may also find a useful application in other types of construction. The invention is not intended to be limited to the details shown, since various modifications may be made without departing from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A positionally stable wheel cover mounted on a wheel, comprising:
    a support bracket with an outer edge and a face plate, the face plate having a center opening and being recessed from the outer edge;
    an external base with a substantially circular hub and a bearing mounted on the substantially circular hub, the bearing of the external base being inserted into the center opening such that the external base being capable of rotating independently from the support bracket; and
    a substantially circular display cover mounted on the external base, the substantially circular display cover having a substantially circular edge extended away axially and radially from the external base, the substantially circular display cover having a top portion and a bottom portion, the bottom portion having more weight than the top portion, the substantially circular display cover having a checking window, checking window having a removable door that is connected through a support hinge to the substantially circular display cover when in an open position and enables a user to inspect lug nuts used to secure the wheel,
    wherein when the wheel is rotating, the substantially circular display cover does not rotate with the wheel.

2. The positionally stable wheel cover of claim 1, wherein the support bracket further comprising a substantially circular skirt with a plurality of vent openings distributed along a length of the substantially circular skirt.

3. The positionally stable wheel cover of claim 1, wherein the bottom portion of the substantially circular display cover further comprising at least a weight element.

4. The positionally stable wheel cover of claim 1, further comprising an internal base with a substantially circular hollow hub, wherein the substantially circular hub of the external base being inserted into the center opening of the support bracket and the substantially circular hollow hub of the internal base, the substantially circular hollow hub enclosing the substantially circular hub of the external base such that the external base being capable of moving independently from the internal base.

5. The positionally stable wheel cover of claim 1, wherein the face plate further comprising a plurality of check holes allowing a visual inspection of mounting lug nuts of the wheel.

6. The positionally stable wheel cover of claim 1, further comprising a locking disk removably mounted on the circular hub of the external base.

7. The positionally stable wheel cover of claim 1, wherein the substantially circular display cover being removably mounted on the external base through a plurality of screws.

8. The positionally stable wheel cover of claim 1, further comprising a mounting ring with a spring recess, a locking connector, and a plurality of holders.

9. The positionally stable wheel cover of claim 8, wherein the support bracket being removably mounted on the plurality of holders through a plurality of screws.

10. The positionally stable wheel cover of claim 1, wherein the checking window having a pie shape.

11. The positionally stable wheel cover of claim 1, wherein the checking window having a C shape.

* * * * *